3,145,228
5-ALKOXY- AND 5-BENZYLOXY-TETRACYCLINE, DERIVATIVES AND ANALOGUES THEREOF

Manfred Schach von Wittenau, Gales Ferry, and Charles R. Stephens, Jr., Niantic, Conn., assignors to Chas. Pfizer & Co., Inc., New York, N.Y., a corporation of Delaware
No Drawing. Filed Sept. 6, 1962, Ser. No. 221,869
21 Claims. (Cl. 260—559)

This invention is concerned with new and useful tetracycline antibiotics and more particularly with 5-substituted tetracyclines. It is also concerned with intermediates for the preparation of these compounds, and with useful salts thereof.

This is a continuation-in-part of our co-pending application S.N. 72,856, filed December 1, 1960, and now abandoned.

The tetracycline antibiotics comprise a group of biologically active perhydronaphthacene derivatives having the following essential structural features. The numbering system indicated is that employed by "Chemical Abstracts."

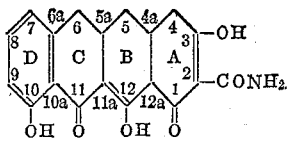

Among the biologically active members of this group are those containing the following substituent groups.

| Substituents | Common Name |
|---|---|
| 4-N(CH₃)₂, 6-OH, CH₃, 12a-OH | Tetracycline. |
| 4-N(CH₃)₂, 5-OH, 6-OH, 6-CH₃, 12a-OH | 5-oxytetracycline. |
| 4-N(CH₃)₂, 6-OH, 6-CH₃, 7-Cl, 12a-OH | 7-chlortetracycline. |
| 4-N(CH₃)₂, 5-OH, 6-CH₃, 12a-OH | 6-deoxy-5-oxytetracycline. |
| 4-N(CH₃)₂, 6-CH₃, 12a-OH | 6-deoxytetracycline. |
| 4-N(CH₃)₂, 12a-OH | 6-deoxy-6-demethyltetracycline. |
| 4-N(CH₃)₂, 6-OH, 6-CH₃, 7-Br, 12a-OH | 7-bromotetracycline. |
| 4-N(CH₃)₂, 6-OH, 7-Cl, 12a-OH | 6-demethyl-7-chlorotetracycline. |
| 4-N(CH₃)₂, 6-OH, 12a-OH | 6-demethyltetracycline. |

The products of the present invention are new compounds of the following structures:

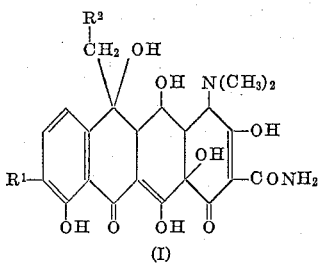

and

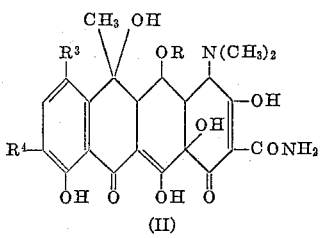

wherein R is selected from the group consisting of lower alkyl and benzyl; $R^1$ is selected from the group consisting of hydrogen, chloro, bromo, iodo and amino; $R^2$ is selected from the group consisting of chloro, bromo, and iodo; $R^3$ is selected from the group consisting of hydrogen and chloro; and $R^4$ is selected from the group consisting of hydrogen and amino.

The present new compounds cannot be directly prepared from the corresponding 5-hydroxytetracyclines. They can, however, be obtained by reduction of new 5-substituted - 5,5a - dehydrotetracyclines corresponding to the Formulas III and IV:

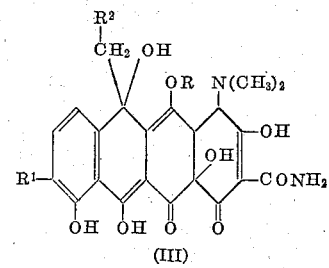

and

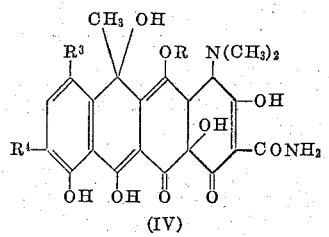

in which R, $R^1$, $R^2$, $R^3$, and $R^4$ have the significance assigned above. It will be apparent that compounds III and IV may also exist as the equivalent tautomeric 5-substituted-5a,11a-dehydrotetracyclines.

These dehydrotetracyclines are prepared by oxidation of a group of new 5-substituted-5a,6-anhydrotetracyclines represented by the Formulas V and VI:

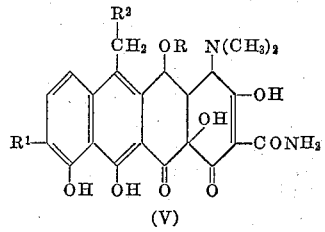

and

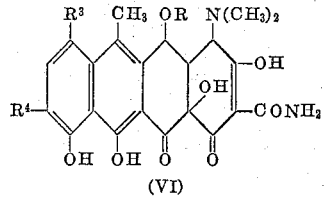

wherein R, $R^1$, $R^2$, $R^3$ and $R^4$ have the same significance as before.

The preparation of the new 5-substituted-5a,6-anhydrotetracyclines V and VI is accomplished by reaction of the corresponding 5 - unsubstituted-5,5a-dehydrotetracyclines with an alcohol, in the presence of a catalyst. The catalysts useful in this reaction are those commonly employed to promote allylic rearrangements, as exemplified by the following:

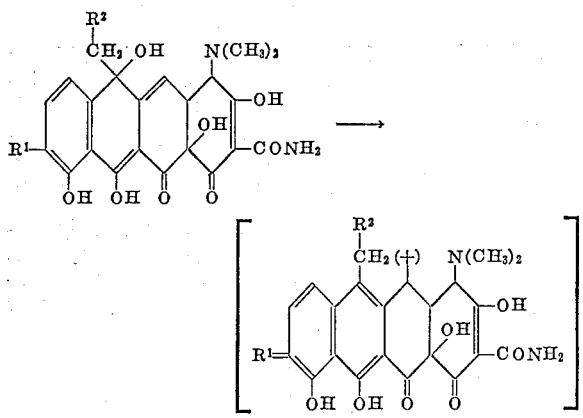

These catalysts include a variety of acids such as mineral acids, e.g., hydrochloric acid, hydrobromic acid, sulfuric acid, phosphoric acid and the like, and Lewis acids such as boron trifluoride, stannic chloride, ferric chloride and their obvious equivalents. The catalyst may be present in catalytic amounts, i.e. as little as 1% to 5% by weight of the starting compound, or it may be used in larger amounts. When the catalyst is a mineral acid, it is usually preferred to incorporate the catalyst in the reaction mixture at a concentration which would provide a solution of the mineral acid in the selected solvent ranging from about 0.05 N to about 0.2 N. This concentration range represents the preferred range since best results are obtained with its use. Of course, larger or even smaller amounts of the acid may be used but the yield of the desired product may be less.

This reaction is generally carried out in a solvent, a wide variety of which may be successfully utilized. Suitable solvents may be determined by routine experimentation in the laboratory and include dioxane, tetrahydrofuran, dialkyl ethers or mono-, di-, tri- and tetra alkylene glycols, for example the dimethyl ethers of ethylene glycol and diethylene glycol, and lower alkanols. The preferred solvents are alkanols, particularly those containing the desired 5-substituent radical. For example, when it is desired to introduce a 5-methoxy group, methanol is the preferred solvent. Temperature does not appear to be critical in this reaction, positive results being obtained over a wide range of temperatures from 0° C. up to the reflux temperature of the reaction mixture. However, best yields are usually obtained between about 50° C. and the reflux temperature of the reaction mixture and hence this represents the preferred range. The reaction is often complete in as little as 30 minutes. The total reaction time required may vary considerably with a number of factors, including the reaction temperature, and the concentration of catalyst and reactants. It is generally found that the reaction is essentially complete when the yellow color of the original reaction mixture turns red.

The 5-benxyloxy anhydrotetracyclines of structures V and VI are prepared in the same fashion, utilizing benzyl alcohol in place of an alkanol. If desired, the reaction mixture may be diluted with a reaction-inert solvent, that is, one which under the conditions employed does not react in an undesired manner with either starting compounds or final products. Suitable solvents include, for example, monoglyme (the dimethyl ether of ethylene glycol) and diglyme (the dimethyl ether of diethylene glycol). In addition to their use as intermediates, these new 5-substituted anhydrotetracyclines corresponding to structures V and VI are also useful as antibacterial agents, particularly for topical use, e.g. in the preparation of ointments, sprays and the like. They exhibit high activity against a variety of microorganisms, including tetracycline-resistant strains. For example, 5-methoxy (A) and 5-ethoxy 5a,6-anhydro-7-chlortetracycline (B) inhibit the growth of the listed microorganisms in vitro at the indicated concentrations:

|  | Minimum Inhibitory Conc., mcg./ml. | |
| --- | --- | --- |
|  | A | B |
| *M. pyogenes* var. *aureus* | 3.12 | 3.12 pi |
| Antibiotic-resistant strain 376 [1] | 12.5 | 6.3 |
| Antibiotic-resistant strain 400 [2] | 12.5 | 6.3 |
| *S. pyogenes* | 1.56 | 3.12 |
| *S. facecalis* | 12.5 | 3.12 |
| *D. pneumoniae* | 12.5 | 12.5 |
| *E. rhusiopathiae* | 0.39 | 3.12 |
| *C. diphtheriae* | 0.39 | 3.12 |
| *L. monocytogenes* | 12.5 | 6.3 |
| *B. subtilis* | 0.78 | 1.56 |
| *L. casei* | 6.3 | 6.3 |
| *B. ammoniagenes* |  | 1.56 |
| *S. typhosa* | 12.5 | 100 |
| *S. pullorum* | 50 | 50 |
| *K. pneumoniae* | 12.5 | >100 |
| *H. influenzae* | 0.78 | 1.56 |
| *P. tumefaciens* |  | 0.78 |
| *B. bronchiseptica* | 3.12 | 6.3 |
| *D. desulfuricans* | 12.5 | 50 |
| *V. comma* | 1.56 | 3.12 |
| *P. multocida* | 0.78 | 1.56 |
| *Mycobacterium 607* |  | 0.78 |
| *M. berolinese* |  | 1.56 |

[1] Resistant to tetracycline at concentrations below 100 mcg./ml.
[2] Resistant to tetracycline at concentrations below 50 mcg./ml.
pi=partial inhibition.

It will be appreciated that the starting compounds for the 5-substitution reaction described, namely, the 5,5a-dehydrotetracyclines, may also exist in the equivalent tautomeric 5a,11a form. The compounds may be prepared in several ways. All of those having a 6-halomethyl group including those which additionally contain a substituent in the 9-position, are prepared from 6-methylene tetracyclines, as fully shown by examples appearing hereinafter. Further examples appearing hereinafter also describe the preparation from 6-methylene tetracyclines of those 5,5a-dehydrotetracyclines having both a 6-methyl and a 9-amino group.

5,5a-Dehydrotetracycline and 7-chloro-5,5a-dehydrotetracycline may be prepared by direct aerobic fermentation (or, under the same conditions, by microbiological oxidation of the well known anhydrotetracyline and 7-chloro anhydrotetracycline) employing suitable strains of *S. aureofaciens*. A number of such strains are publicly available, including *S. aureofaciens* ATCC 12748, 12749, 12750, 12751 and 13191, cultures of which are obtainable from the American Type Culture Collection in Washington, D.C. For preparation of 7-chloro-5,5a-dehydrotetracycline this fermentation is carried out in a conventional chloride-ion-containing aqueous nutrient medium, and for preparation of the 7-deschloro analog a medium deficient in chloride ions is utilized, that is, one containing less than about 50 parts per million chloride ion.

In other respects the fermentation procedure for the preparation of the two analogs is the same, and corresponds to presently known methods of producing chlortetracycline by fermentation. This is, the fermentation medium contains the usual nutrients and mineral substances. Suitable nutrient substances which may provide those necessary substances include starch, dextrose, cane sugar, glucose, molasses, soybean meal, peanut meal, yeast, meat extracts, peptone, urea, corn steep liquor, distillers solubles, fish meal and other conventional substances. The inorganic salts include such substances as calcium carbonate, ammonium sulfate, ammonium chloride, and the various trace elements such as manganese, cobalt, zinc, copper, iron and the like. Corn steep media containing from about 0.1 to 2.0 parts per million added riboflavin often provide especially high yields.

The other general conditions of the fermentation, such as hydrogen ion concentration, temperature, time, rate of aeration, preparation of the inoculum, sterilization, inoculation and the like are conventional and may be similar to those for the production of chlortetracycline shown in the Duggar United States Patent No. 2,482,055.

The dehydrotetracyclines may be isolated from the fermentation broth by various procedures. For example, the broth may be adjusted to pH 1–2 with mineral acid, filtered, and the filtrate adjusted to about pH 8.5 to precipitate the product. Alternatively, the filtered broth may be extracted with an alcohol such as n-butanol. The extract is then concentrated and chromatographed on a diatomaceous earth column in the well known manner and the column developed by treatment with 80:20 n-butanol:chloroform. The effluent fractions are then concentrated and lyophilized. Crude product may be crystallized one or more times from methanol for further purification.

The conversion of the 5-substituted-5a,6-anhydrotetracyclines of structures V and VI to the corresponding 5-substituted-5,5a-dehydrotetracyclines of structures III and IV is accomplished by microbiological means. The anhydrotetracycline selected is added to a fermentation medium inoculated with one of the strains of S. aureofaciens capable of producing dehydrotetracyclines, such as one of those described above, e.g. S. aureofaciens ATCC 12748. Fermentation media and conditions are as set forth above for the preparation of 7-chloro dehydrotetracycline. In recovering the products it is desirable to avoid strong acid treatment. One suitable procedure involves the addition of methanol, followed by mycelium filtration, concentration, extraction of the aqueous concentrate with butanol and precipitation with hexane. The resulting product may be further purified, if desired, by column chromatography employing known solvent systems. However, it is usually more convenient to proceed with the hydrogenation step, since the products produced thereby are more acid-stable and are conveniently purified by countercurrent solvent distribution in acidic systems such as butanol dilute hydrochloric acid.

Alternatively, the conversion of the 5-substituted-5a,6-anhydrotetracyclines of structures V and VI to the corresponding 5-substituted-5,5a-dehydrotetracyclines of structures III and IV may be effected by the photooxidation procedure of Scott and Bedford, as described in the Journal of the American Chemical Society, volume 84, pp. 2271-2 (1962). In accordance with this procedure the anhydrotetracycline is oxidized to the corresponding 6-deoxy-6-hydroperoxy dehydrotetracycline by contacting a solution of the starting compound in a reaction-inert solvent with oxygen or air while irradiating with light of about 300–450 m$\mu$ wave length; and subsequently reducing the hydroperoxy compound to the desired dehydrotetracycline, for example by treatment with an aqueous solution of an alkali metal sulfite or hydrosulfite, or by hydrogenation in the presence of a noble metal catalyst such as palladium or rhodium. In the case of catalytic hydrogenation, continued reaction may lead to further reduction of the dehydrotetracycline product, i.e. to the corresponding tetracycline, as well as to removal of a 7-halo substituent where present, particularly when palladium is employed as catalyst. Thus, where it is desired to recover the 5-substituted-5,5a-dehydrotetracycline, the reaction should be halted when the calculated proportion of hydrogen has been consumed.

Various procedures, including catalytic hydrogenation and microbiological reduction, are effective for reduction of the 5-substituted-5,5a-dehydrotetracyclines of structures III and IV to the 5-substituted tetracyclines of structures I and II. The microbiological reduction is effected by adding the dehydrotetracycline to a fermentation medium inoculated with a conventional chlortetracycline- or tetracycline-synthesizing strain of S. aureofaciens, such as publicly available S. aureofaciens NRRL 2209 (obtainable from the Northern Regional Research Laboratories at Peoria, Illinois) and allowing fermentation to proceed under aerobic conditions. The conditions of the fermentation may be the same as the known methods of producing chlortetracycline and tetracycline by fermentation, except for the addition of one of the new dehydrotetracyclines at the beginning of, or during, the fermentation. The media and fermentation conditions set forth above for the preparation of 7-chloro dehydrotetracycline are also suitable here. Recovery of the 5-substituted tetracyclines is likewise conventional.

As an alternative to microbiological reduction, the conversion of the 5-substituted-5,5a-dehydrotetracyclines of the present invention to the corresponding 5-substituted tetracyclines may be effected by catalytic hydrogenation. The hydrogenation reaction is carried out under conventional conditions. The dehydrotetracycline is dissolved in a reaction-inert solvent and then subjected to treatment with hydrogen gas over a noble metal catalyst, including palladium, platinum, rhodium, and the like. Suitable solvents include dimethyl formamide, dioxane, tetrahydrofuran, monoglyme, diglyme, and the like. If desired, the catalyst may be one which is suspended in an inert carrier, such as palladium on carbon. The hydrogenation may be carried out at atmospheric or superatmosphere pressures of hydrogen gas, i.e. up to several thousand pounds per square inch. It is generally preferred, however, to employ pressures of from about 2 to about 4 atmospheres, since these are found most convenient. The reaction temperature does not appear to be critical. Excellent results are obtained with temperatures up to about 50° C. The use of higher temperature, though operable, is not recommended, since lower yields of the desired product may result.

After the reaction is complete, as indicated by the absorption of one mole of hydrogen, the product is obtained in the usual manner, e.g. filtration of the catalyst and concentration of the reaction mixtures. The products may be further purified by countercurrent distribution in butanol:0.01N aqueous HCl. In the case of those dehydrotetracyclines containing a 7- or 9-halo group, hydrogenolysis of the latter may concurrently occur, in which case the hydrogen uptake will be correspondingly greater. The latter reaction is facilitated by the presence of a base, e.g. triethylamine. However, under mild conditions, and particularly where rhodium on carbon is employed as catalyst, it is possible to hydrogenate at the 5,5a-position without concurrent removal of halo substituents in the D ring.

The new 5-substituted tetracyclines corresponding to structures I and II, such as 5-methoxy 7-chlortetracycline, possess a surprisingly high order of activity against a variety of microorganisms both in vitro and in vivo. In many cases their effectiveness is greater than that of prior art tetracyclines. These substances are useful in therapy, in agriculture, and in veterinary practice both therapeutically and as growth stimulants. The 5-alkoxy-7-chlortetracyclines possess a particularly high order of antimicrobial activity.

The new 5-benzyloxy tetracyclines may also be further reduced to the corresponding 5-hydroxytetracyclines, including the valuable new antibiotic, 5-hydroxy-7-chlortetracycline, which exhibits higher in vivo activity than related prior art tetracyclines. Catalytic hydrogenolysis, employing for example rhodium on carbon, of 5-benzyloxy-7-chlortetracycline is a suitable method of preparation. Alternatively, it may be prepared directly from 5-benzyloxy-5,5a-dehydro-7-chlortetracycline without isolation of the 5-benzyloxy-7-chlortetracycline. The previously described conditions for catalytic hydrogenation are also applicable here, except that the reaction is permitted to proceed further, with the uptake of an additional mole of hydrogen.

For human therapy, the usual oral dosage of the new tetracyclines of the present invention, as well as 5-hydroxy-7-chlortetracycline, is from about 0.2 to about 2 g. per day for the average adult. The products are formulated into capsules or tablets containing from 25 to 250 mg. of antibiotic on an activity basis. Suspensions or solutions in various vehicles are prepared having concentrations ranging from 5 to 125 mg./ml. For parenteral administration intramuscularly or intravenously, the daily dose is reduced to about 0.1 to 1.0 g. Intramuscular formulations comprise solutions of the antibiotic at concentrations ranging from 50 to 100 mg./ml. Intravenous administration is by means of isotonic solutions having antibiotic concentration of about 10 mg./ml. Both types of parenteral product are conveniently distributed as solid compositions for reconstitution. In all instances, of course, the attending physician will indicate the dosage to fit the needs of a particular patient. For children, smaller doses are generally used.

The present invention embraces all salts, including acid-addition and metal salts, of the new amphoteric substances. The well-known procedure for preparing salts of tetracycline compounds are applicable here and are illustrated by examples appearing hereinafter. Such salts may be formed with both pharmaceutically acceptable and pharmaceutically unacceptable acids and metals. By "pharmaceutically acceptable" is meant those salt-forming acids and metals which do not substantially increase the toxicity of the amphoteric substance. Of particular value in the case of the therapeutically active tetracyclines are the acid addition salts and pharmaceutically acceptable metal salts. In the case of the compounds herein which are primarily useful as intermediates, the most useful salts are the alkali- and alkaline-earth metal salts.

The pharmaceutically acceptable acid addition salts are of particular value in therapy. These include salts of mineral acids such as hydrochloric, hydriodic, hydrobromic, phosphoric, metaphosphoric, nitric and sulfuric acids, as well as salts of organic acids such as tartaric, acetic, citric, malic, benzoic, glycollic, gluconic, gulonic, succinic, arylsulfonic, e.g. p-toluene-sulfonic acids, and the like. The pharmaceutically unacceptable acid addition salts, while not useful for therapy, are valuable for isolation and purification of the new substances. Further, they are useful for the preparation of pharmaceutically acceptable salts. Of this group, the more common salts include those formed with hydrofluoric and perchloric acids. Hydrofluoride salts are particularly useful for the preparation of the pharmaceutically acceptable salts, e.g. the hydrochlorides, by solution in hydrochloric acid and crystallization of the hydrochloride salt formed. The perchloric acid salts are useful for purification and crystallization of the new products.

Whereas all metal salts may be prepared and are useful for various purposes, the pharmaceutically acceptable metal salts are particularly valuable because of their utility in therapy. The pharmaceutically acceptable metals include more commonly sodium, potassium and alkaline earth metals of atomic number up to and including 20, i.e. magnesium and calcium, and additionally, aluminum, zinc, iron and manganese, among others. Of course, the metal salts include complex salts, i.e. metal chelates, which are well recognized in the tetracycline art. The pharmaceutically unacceptable metal salts embrace most commonly salts of lithium and of alkaline earth metals of atomic number greater than 20, i.e. barium and strontium, which are useful for isolating and purifying the compounds. Since the new substances are amphoteric, they also form salts with amines of sufficient basicity.

It will be obvious that, in addition to their value in therapy, the pharmaceutically acceptable acid and metal salts are also useful in isolation and purification.

The following examples are provided for illustrative purposes and should not be interpreted as limiting the invention, many variations of which are possible without departing from the spirit or scope thereof.

EXAMPLE I

A sterile water suspension containing 60–80 million spores per ml. of *S. aureofaciens* ATCC 12748 is employed to inoculate 24 volumes of a sterile tap water medium containing the following ingredients per liter:

| | |
|---|---|
| Sucrose _____grams__ | 30 |
| Ammonium sulfate _____do____ | 2 |
| Calcium carbonate _____do____ | 7 |
| Corn steep liquor _____ml__ | 16.5 |

The inoculated medium is incubated for 24 hours at 28° C. with shaking.

One volume of the inoculum prepared in this manner is introduced into 25 volumes of a sterile water medium containing the following ingredients per liter:

| | |
|---|---|
| Ammonium sulfate _____grams__ | 5 |
| Calcium carbonate _____do____ | 9 |
| Ammonium chloride _____do____ | 1.5 |
| Magnesium chloride hexahydrate _____do____ | 2 |
| Ferrous sulfate heptahydrate _____do____ | 0.04 |
| Manganese sulfate tetrahydrate _____do____ | 0.05 |
| Cobalt chloride hexahydrate _____do____ | 0.001 |
| Zinc sulfate heptahydrate _____do____ | 0.1 |
| Corn steep _____do____ | 25–30 |
| Starch _____do____ | 55 |
| Lard oil _____ml__ | 2 |

Submerged aerobic fermentation is carried out for 120 hours at 25° C. and 200 ml. of the broth obtained is adjusted to pH 1.5 with conc. hydrochloric acid and filtered. The filter cake is washed with acid water, the combined filtrate and wash are treated with 54 grams sodium chloride, and the resulting solution is extracted with three 60 ml. portions of n-butanol. The combined butanol extracts are concentrated to about 17 ml., saturated with water, and filtered. The filtrate is applied to a 2 x 12" diatomaceous earth (Johns Manville Celite) column containing 0.5 ml. water (adjusted to pH 2 with hydrochloric acid) per gram of Celite. The column is then developed with 80:20 n-butanol:chloroform saturated with 0.01 NHCl. Of 34 consecutive 10 ml. effluent fractions collected, fractions 12–23 are combined, the solvent replaced by water while concentrating, and the solution freeze-dried. The 7-chloro-5,5a-dehydrotetracycline obtained is crystallized from one ml. methanol, and the crystals washed with 50:50 methanol:ether and dried.

One gram of the product prepared as described is dissolved in 3 ml. methanol by adding sufficient conc. hydrochloric acid to effect solution. The solution obtained is filtered and adjusted to pH 4.0 with saturated sodium carbonate solution. The hydrochloride crystals are filtered, washed and dried.

EXAMPLE II

The procedure of Example I is repeated, substituting the following low-chloride fermentation media, to prepare the corresponding 7-deschloro dehydrotetracycline:

| | Inoculum | Fermentation |
|---|---|---|
| Sucrose_____g__ | 30.0 | 40.0 |
| Sodium citrate_____ | 1.0 | 2.0 |
| Ammonium sulfate_____ | 3.3 | 3.3 |
| $MgSO_4 \cdot 7H_2O$_____ | 0.25 | 0.25 |
| $K_2HPO_4$_____ | 0.1 | 0.1 |
| $KH_2PO_4$_____ | 0.1 | 0.1 |
| $CaCO_3$_____ | 1.0 | 1.0 |
| $ZnSO_4 \cdot 7H_2O$_____ | 0.04 | 0.04 |
| $MnSO_4 \cdot 4H_2O$_____ | 0.01 | 0.01 |
| $K_2Cr_2O_7$_____mg__ | 0.016 | 0.016 |
| Acetic acid_____ml__ | 0.4 | 0.2 |
| Distilled water to make_____ml__ | 1,000 | 1,000 |

EXAMPLE III 5 grams of the product of Example I is dissolved in a liter of 0.06 N methanolic HCl and the mixture is allowed to stand for 17 hours at room temperature. The mixture is then evaporated at reduced pressure and the residue crystallized from ethyl acetate-methanol. After a pre-crop of unreacted starting material, 5-methoxy-5a,6-anhydro-7-chlortetracycline is separated and dried. The product, which is quite hygroscopic, has $[\alpha]_D = -229°$ as a 1% solution in methanol.

*Analysis.* — Calculated for $C_{23}H_{23}N_2O_8Cl \cdot HCl \cdot 1/2$ $H_2O$: C, 5150; H, 4.70; N, 5.23; $OCH_3$, 5.97. Found: C, 51.41; H, 5.01; N, 4.46; $OCH_3$, 5.74.

The amphoteric form separates upon dissolving the hydrochloride in minimum methanol and neutralizing the solution with dilute aqueous sodium hydroxide.

EXAMPLE IV

The procedure of Example III is repeated, substituting 0.12 N ethanolic HCl for the methanolic HCl of the previous example. 5-ethoxy-5a,6-anhydro-7-chlortetracycline having $[\alpha]_D = -181°$ (in 0.2% methanolic solution), is obtained.

*Analysis.* — Calculated for $C_{23}H_{23}N_2O_8Cl \cdot HCl \cdot 1/2$ 53.24; H, 4.84; N, 5.18; $OC_2H_5$, 8.3. Found: C, 53.71; H, 5.25; N, 4.85; $OC_2H_5$, 9.1.

EXAMPLE V

One gram of the product of Example I is solubilized in 250 ml. propanol by the addition of 1 ml. triethylamine, and 35 ml. of approximately 1.5 N HCl in propanol added. The mixture is refluxed for one hour, and 5-propoxy-5a,6-anhydro-7-chlortetracycline is obtained by evaporation of the solvent. In corresponding manner, the 5-butoxy derivative is obtained by substituting a 0.02 N hydrogen chloride solution in butanol as the solvent, heating for 6 hours at 60° C. The 5-isopropoxy, 5-β-chloroethoxy, 5-β-bromoethoxy, 5-iodopropoxy, and 5-fluoroethoxy-5a,6-anhydro-7-chlortetracyclines are obtained in the same fashion.

EXAMPLE VI 5-benzyloxy-5a,6-anhydro-7-chlortetracycline is prepared by heating the following mixture at 80–85° C. for 20 minutes:

27 mg. dehydro chlortetracycline hydrochloride (Example I)
5 ml. benzyl alcohol
0.5 ml. 1.5 N benzyl alcohol HCl A half ml. of the reaction mixture is then neutralized with triethylamine and evaporated to dryness at 60° C. under reduced pressure. The residue is recrystallized from 2.5 ml. of 0.01 N methanolic HCl.

EXAMPLE VII

The 7-deschloro analogs of the products of Examples III through VI are prepared as therein described, substituting the dehydrotetracycline of Example II for the 7-chloro dehydrotetracycline.

EXAMPLE VIII

The procedures of Examples III through VI are employed to prepare the following 5-substituted 5a,6-anhydrotetracyclines from the appropriate dehydrotetracyclines:

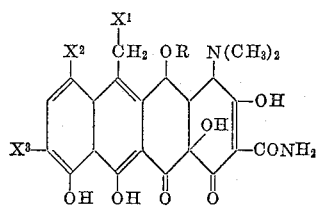

| R | $X^1$ | $X^2$ | $X^3$ |
|---|---|---|---|
| $CH_3$ | H | H | $NH_2$ |
| $CH_3$ | H | Cl | $NH_2$ |
| $C_2H_5$ | Cl | H | $NH_2$ |
| $C_4H_9$ | Br | H | $NH_2$ |
| $CH_3$ | I | H | H |
| $CH_3$ | Cl | H | I |
| $CH_3$ | Cl | H | H |
| $CH_3$ | Br | H | H |
| $CH_3$ | Br | H | Cl |
| Benzyl | I | H | Br |
| i-$C_3H_7$ | Br | H | I |
| $CH_3$ | Cl | H | Cl |
| $C_2H_5$ | Br | H | Br |
| $C_2H_5$ | Cl | H | Br |
| $C_3H_7$ | I | H | I |

The products exhibit activity against a variety of microorganisms.

EXAMPLE IX

Inoculum prepared as described in Example I is introduced into 25 times its volume of a sterile water medium containing the following ingredients per liter:

|  | Grams |
|---|---|
| Ammonium sulfate | 5 |
| Calcium carbonate | 9 |
| Ammonium chloride | 1.5 |
| Magnesium chloride hexahydrate | 2 |
| Ferrous sulfate heptahydrate | 12 |
| Manganese sulfate tetrahydrate | 10 |
| Cobalt chloride hexahydrate | 1 |
| Zinc sulfate heptahydrate | 20 |
| Corn steep liquor | 25 |
| Starch | 55 |

The inoculated medium is incubated at 25° C. on a rotary shaker for 48 hours. At this point 5-methoxy-5a,6-anhydro-7-chlortetracycline, prepared as described in Example III is added to the broth under sterile conditions at a concentration of 0.5 g. per liter, and the fermentation is allowed to proceed for an additional 72 hours under aerating conditions.

At this time the fermentation is halted, the broth is diluted with an equal volume of methanol, and the mixture is filtered to separate the mycelium. The filtrate is then concentrated under reduced pressure to remove the methanol, while adding water to maintain the volume. The aqueous concentrate is then extracted with two ¼-volume portions of butanol. The combined butanol extracts are treated with hexane to precipitate the 5-methoxy-5,5a-dehydro-7-chlortetracycline which is recovered by filtration and further purified by leaching with methanol. The same product is also prepared from 5-methoxy-5a,6-anhydro-7-chlortetracycline by the photo-oxidation procedure described hereinafter in Example XXXIX, Method B.

Following these procedures the following additional 5-substituted-5,5a-dehydrotetracyclines are prepared from the corresponding 5-substituted-5a,6-anhydrotetracyclines of Examples IV–VIII:

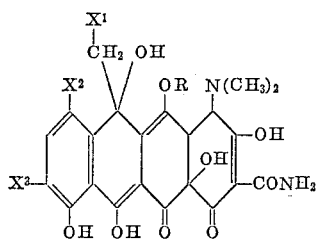

| R | $X^1$ | $X^2$ | $X^3$ |
|---|---|---|---|
| $CH_3$ | H | H | H |
| $C_2H_5$ | H | Cl | H |
| $C_3H_7$ | H | Cl | H |
| $C_4H_9$ | H | Cl | H |
| $i-C_3H_7$ | H | Cl | H |
| Benzyl | H | Cl | H |
| $C_2H_5$ | H | H | H |
| $C_3H_7$ | H | H | H |
| $C_4H_9$ | H | H | H |
| $i-C_3H_7$ | H | H | H |
| Benzyl | H | H | H |
| $CH_3$ | H | H | $NH_2$ |
| $CH_3$ | H | Cl | $NH_2$ |
| $C_2H_5$ | Cl | H | $NH_2$ |
| $C_4H_9$ | Br | H | $NH_2$ |
| $CH_3$ | I | H | H |
| $CH_3$ | Cl | H | I |
| $CH_3$ | Cl | H | H |
| $CH_3$ | Br | H | H |
| $CH_3$ | Br | H | Cl |
| Benzyl | I | H | Br |
| $i-C_3H_7$ | Br | H | I |
| $CH_3$ | Cl | H | Cl |
| $C_2H_5$ | Br | H | Br |
| $C_2H_5$ | Cl | H | Br |
| $C_3H_7$ | I | H | I |

EXAMPLE X 5-methoxy-5,5a-dehydrotetracycline, prepared as described in Example IX, is hydrogenated in ethanol or dimethyl formamide solution over 5% palladium on carbon by subjecting the agitated mixture to 50 p.s.i. hydrogen pressure at room temperature until a mole of hydrogen is absorbed per mole of the dehydrotetracycline. The 5-methoxy tetracycline produced is recovered by filtering, drying the filtrate under reduced pressure, and crystallizing the residue from water.

Following the described procedure, the following additional 5-substituted tetracyclines are prepared by reduction of the appropriate 5-substituted-5,5a-dehydrotetracyclines. The products exhibit useful activity against a variety of microorganisms.

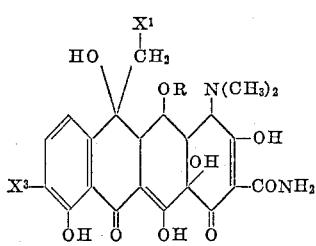

| R | $X^1$ | $X^3$ |
|---|---|---|
| $C_2H_5$ | H | H |
| $C_3H_7$ | H | H |
| $C_4H_9$ | H | H |
| $i-C_3H_7$ | H | H |
| Benzyl | H | H |
| $CH_3$ | H | $NH_2$ |
| $C_4H_9$ | Br | $NH_2$ |
| $CH_3$ | I | H |
| $CH_3$ | Cl | H |
| $CH_3$ | Br | H |

EXAMPLE XI

A sterile aqueous fermentation medium containing the following ingredients per liter is inoculated with S. aureofaciens NRRL 2209:

| | | |
|---|---|---|
| Calcium carbonate | grams | 9 |
| Ammonium sulfate | do | 5.6 |
| Manganese sulfate | mg | 80 |
| Cobalt chloride hexahydrate | mg | 5 |
| Ammonium chloride | grams | 1.7 |
| Starch | do | 55 |
| Corn steep liquor | do | 25 |
| Lard oil | ml | 32 |

To this is added 5-methoxy-5,5a-dehydro-7-chlortetracycline at a concentration of 0.5 gram per liter and fermentation is permitted to proceed for 120 hours at 25° C. with agitation. The broth is acidified to pH 1–2 with mineral acid and filtered to remove the mycelium. The filtrate is found to contain 5-methoxy-7-chlortetracycline, which may be separated and identified by paper strip chromatography.

In the same manner the following 5-substituted tetracyclines are prepared from the corresponding 5-substituted-5,5a-dehydrotetracyclines. The products are found to exhibit significant activity against a variety of microorganisms.

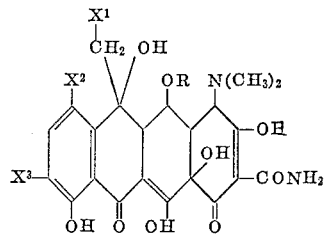

| R | $X^1$ | $X^2$ | $X^3$ |
|---|---|---|---|
| $C_2H_5$ | H | Cl | H |
| $C_3H_7$ | H | Cl | H |
| $C_4H_9$ | H | Cl | H |
| $i-C_3H_7$ | H | Cl | H |
| Benzyl | H | Cl | H |
| $CH_3$ | H | Cl | $NH_2$ |
| $C_2H_5$ | Cl | H | $NH_2$ |
| $CH_3$ | Cl | H | I |
| $CH_3$ | Br | H | Cl |
| Benzyl | I | H | Br |
| $i-C_3H_7$ | Br | H | I |
| $CH_3$ | Cl | H | Cl |
| $C_2H_5$ | Br | H | Br |
| $C_2H_5$ | Cl | H | Br |
| $C_3H_7$ | I | H | I |

EXAMPLE XII

A solution of 1 gram 5-methoxy-5,5a-dehydro-7-chlortetracycline in 100 ml. glacial acetic acid is treated with 1 gram 5% rhodium on charcoal. The mixture is subjected to 50 p.s.i. hydrogen pressure at room temperature with agitation until 1 mole of hydrogen has been absorbed per mole of the dehydrotetracycline. The solution is then filtered and the filtrate is dried under reduced pressure. The residue is purified by countercurrent distribution between butanol and 0.01 N hydrochloric acid to yield 5-methoxy-7-chlortetracycline.

The other 5-substituted tetracyclines of Example XI are obtained in the same manner from the corresponding 5-substituted-5,5a-dehydrotetracyclines.

EXAMPLE XIII

A solution of 1 gram 5-benzyloxy 7-chlortetracycline hydrochloride (Example XII) in 100 ml. 50% aqueous dioxane is treated with 1 gram 5% rhodium on charcoal and the mixture subjected to 50 p.s.i. hydrogen pressure at room temperature. When 1 mole of hydrogen has been taken up per mole of the tetracycline, the solution is filtered and the filtrate evaporated to dryness under reduced pressure. The residue is crystallized from water to yield 5-hydroxy-7-chlortetracycline. The product exhibits in vitro and in vivo activity against a variety of microorganisms.

EXAMPLE XIV

Amphoteric 5-hydroxy-7-chlortetracycline is converted to the corresponding hydrochloride by dissolving the tetracycline compound in methanol containing an equivalent amount of hydrogen chloride. The hydrochloride salt is then isolated by concentration of the reaction mixture.

The hydrochloric, hydrobromic, hydrofluoric, sulfuric, hydriodic and phosphoric acid salts of the products of Examples III–VIII and X–XIII are prepared in the same manner. The amino tetracyclines are diacidic bases, and form corresponding series of salts, e.g. mono- and dihydrochlorides.

Similarly, salts are formed with tartaric, citric, malic, benzoic, glycollic, gluconic, gulonic, succinic, and acetic acids.

EXAMPLE XV

The sodium salt of 5-hydroxy-7-chlortetracycline is prepared by dissolving the amphoteric substance in water containing an equivalent amount of sodium hydroxide and freeze-drying the resulting solution.

Similarly, the sodium potassium, lithium, calcium, barium, strontium and magnesium salts of the tetracyclines of Examples III–XII are prepared.

The metal salt complexes of the tetracyclines of Examples III–XIII are prepared by dissolving them in a lower aliphatic alcohol, preferably methanol, and treating with an equimolar amount of the selected metal salt, preferably dissolved in the selected alcohol. The complexes are isolated by simple filtration or, where they are alcohol-soluble, by evaporation of the solvent or addition of a non-solvent such as diethyl ether. In this fashion, metal salt complexes containing a 1:1 molar ratio of metal to tetracycline are prepared, employing the following metal salts: calcium chloride, cobalt chloride, cadmium chloride, barium chloride, silver nitrate, stannous nitrate, strontium nitrate, magnesium acetate, manganous acetate, palladium chloride, manganous chloride, cerium chloride, titanium chloride, platinum chloride, vanadium chloride, plumbous acetate, stannous bromide, zinc sulfate, chromous chloride and nickellous chloride.

EXAMPLE XVI

A suspension of 5 - hydroxy - 7 - chlortetracycline is prepared with the following composition:

| | |
|---|---|
| Antibiotic _____g__ | 31.42 |
| 70% aqueous sorbitol _____g__ | 714.29 |
| Glycerine, U.S.P. _____g__ | 187.35 |
| Gum acacia (10% aqueous solution) _____ml__ | 100. |
| Polyvinyl pyrrolidone _____g__ | 0.5 |
| Butyl parahydroxybenzoate (preservative) ___g__ | 0.172 |
| Propyl parahydroxybenzoate (preservative) __g__ | 0.094 |
| Water, distilled, to make _____liter__ | 1 |

To this suspension, various sweetening and flavoring agents, as well as acceptable colors, may be added by choice. The suspension contains approximately 25 mg. of antibiotic activity per milliliter.

EXAMPLE XVII

A solution of 5 - hydroxy - 7 - chlortetracycline is prepared with the following composition:

| | |
|---|---|
| Antibiotic _____g__ | 30.22 |
| Magnesium chloride hexahydrate _____g__ | 12.36 |
| Monoethanolamine _____ml__ | 8.85 |
| Propylene glycol _____g__ | 376 |
| Water _____ml__ | 94 |

The solution has a concentration of 50 mg./ml. and is suitable for parenteral, and especially for intramuscular administration.

EXAMPLE XVIII

A tablet base is prepared by blending the following ingredients in proportion by weight indicated:

| | |
|---|---|
| Sucrose U.S.P. _____ | 80.3 |
| Tapioca starch _____ | 13.2 |
| Magnesium stearate _____ | 6.5 |

Into this base there is blended sufficient 5-hydroxy-7-chlortetracycline to provide tablets containing 25, 100 and 250 mg. of active ingredient.

EXAMPLE XIX

A blend is prepared containing the following ingredients:

| | Grams |
|---|---|
| Calcium carbonate U.S.P. _____ | 17.6 |
| Dicalcium phosphate _____ | 18.8 |
| Magnesium trisilicate U.S.P. _____ | 5.2 |
| Lactose U.S.P. _____ | 5.2 |
| Potato starch _____ | 5.2 |
| Magnesium stearate A _____ | 0.8 |
| Magnesium stearate B _____ | 0.32 |

To this blend is added sufficient 5-hydroxy-7-chlortetracycline to provide capsules containing 25, 100 and 250 mg. of active ingredient.

EXAMPLE XX

One thousand grams of 5-hydroxy-7-chlortetracycline are intimately mixed and ground with 2500 grams of ascorbic acid. The ground, dry mixture is filled into vials, sterilized with ethylene oxide and the vials sterilely stoppered. For intravenous administration sufficient water is added to the vials to form a solution containing 10 mg. of active ingredient per milliliter.

The procedures of Examples XVI–XX are repeated with other tetracyclines described in Examples III–VIII and X–XII to form corresponding dosage forms.

EXAMPLE XXI

*11a-Fuorotetracycline-6,12-Hemi-Ketal*

To a suspension of 20 g. of tetracycliine base in 800 ml. of water cooled to 0° C. is added 45 ml. (2 equivalents) of 2 N sodium hydroxide solution. The tetracycline dissolves to yield a solution the pH being approximately 11. Perchloryl fluoride is then bubbled through the stirred solution (maintained under a nitrogen atmosphere) until the pH of the mixture approximates 7. A heavy precipitate starts to form between pH 8 and 8.5. The excess perchloryl fluoride is flushed out with a stream of nitrogen and the nearly white crystalline material is filtered off, washed with water and dried under vacuum at room temperature to obtain 7.9–8.5 g. of product. Ultraviolet absorption shows maxima at 267 and 340 m$\mu$; infrared shows no carbonyl absorption below 6 microns. Bioassay against *K. pneumoniae* shows an activity of 8 mcg./mg. on the tetracycline scale. Elemental analysis gives the following results.

Calcd. for: $C_{22}H_{23}N_2O_8FH_2O$; C, 54.95; H, 5.20; N, 5.83. Found: C, 54.97; H, 5.19; N, 5.85.

EXAMPLE XXII

*11a-Chlorotetracycline-6,12-Hemi-Ketal*

To a solution of 2.2 g. of anhydrous tetracycline in 25 ml. of monoglyme (dimethyl ether of ethylene glycol) is added 800 mg. of N-chloro-succinimide with stirring to dissolve the reagent. The mixture is allowed to stand for seven minutes and then diluted with water (25 ml.). The product, 873 mg., crystallizes as white needles. Bioassay of the product shows a tetracycline activity of about 4 mg./mg. against *K. pneumoniae*. Infrared analysis shows no carbonyl bands between 5 and 6 microns. Ultraviolet absorption shows maxima at 267 and 340–342 m$\mu$.

On treatment of this product with sodium hydrosulfite inaqueous dimethylformamide at room temperature, tetracycline is regenerated. Bioassay of the reaction mixture shows a tetracycline activity of 520–665 mcg./mg. (*K. pneumoniae*).

The crystalline hydrochloride of this product is obtained by dissolving it in excess aqueous HCl (pH ca. 1) and freeze drying the mixture.

EXAMPLE XXIII

*7,11a-Dichlorotetracycline-6,12-Hemi-Ketal*

A mixture of 2.4 g. of anhydrous 7-chlorotetracycline, 800 mg. of N-chlorosuccinimide and 25 ml. of the dimethyl ether of ethylene glycol is stirred for 2½ minutes after which 100 ml. of ether is added followed by 300 ml. of hexane. The precipitate thus formed is collected by filtration, washed with hexane and dried.

In similar fashion, 7-bromo-11a-chlorotetracycline-6,12-hemi-ketal is prepared from 7-bromotetracycline.

EXAMPLE XXIV

*11a-Chloro-6-Deoxy-6-Demethyl-6-Methylenetetracycline*

11a-chlorotetracycline-6,12-hemi-ketal is dissolved in liquid hydrogen fluoride (in a ratio of 2 g./15 ml.) at 0° C. The mixture is maintained at this temperature for 10–15 minutes, after which the hydrogen fluoride is evaporated off. The residue is triturated in ether to obtain the solid product, 11a - chloro-6-deoxy-6-demethyl-6-methylenetetracycline, as the hydrofluoride salt which is recrystallized from methanol.

Alternatively, the crude hydrofluoride product (10 g.) is dissolved in 350 ml. of $H_2O$ by warming and stirring. An equal volume of conc. HCl is added to the clear solution and the product crystallizes as the hydrochloride salt. Elemental analysis of the hydrochloride salt thus obtained gives the following results.

Calcd. for: $C_{22}H_{22}O_7N_2Cl_2$; C, 53.11; H, 4.56; chloride, 7.13; N, 5.63. Found: C, 52.62; H, 4.63; chloride, 6.84; N, 5.54.

Infrared analysis of the product as the hydrochloride salt in a KBr pellet at 1% concentration shows carbonyl absorption at 5.70 as well as the following significant peaks: 6.1, 6.23, 6.36, 6.45 (shoulder), 6.91, 7.85, 8.14, 8.55, 10.22, 10.55 and 10.89. Bioassay of the product (*K. pneumoniae*) shows an oxytetracycline activity of 50–100 mcg./mg. Ultraviolet analysis of the sample in 0.01 N methanol-HCl shows maxima at 376, 278, and 242 m$\mu$. The product shows an Rf value of from 0.2 to 0.3 in the following system.

Mobile Phase:
    20:3 toluene-pyridine saturated with pH 4.2 buffer
Immobile Phase:
    pH 4.2 buffer (aqueous)

On analysis of the papergram with ultraviolet light, the product spot does not fluoresce strongly. However, on spraying, with aqueous sodium hydrosulfite, it shows strong fluorescence.

The C.4 epimer of the product, present as a minor impurity, shows Rf 0.1 in this system.

EXAMPLE XXV

*11a-Fluoro-6-Deoxy-6-Demethyl-6-Methylenetetracycline*

11a-fluorotetracycline-6,12-hemi-ketal, 250 mg. is stirred in 2 ml. of 63% aqueous perchloric acid. The solid dissolves on warming to 60°–65° C. for 15 minutes, after which the mixture is cooled and water is added to obtain 11a-fluoro-6-deoxy-6-demethyl-6-methylenetetracycline as the chlorate salt. The product shows similar absorption on ultraviolet analysis to that of Example XXIV.

EXAMPLE XXVI

The following compounds are prepared from corresponding 11a - halotetracycline - 6,12 - hemi-ketals by the procedure of Example XXIV:

7,11a-dichloro-6-deoxy-6-demethyl - 6 - methylenetetracycline

7 - bromo-11a-chloro-6-deoxy-6-demethyl - 6 - methylenetetracycline

EXAMPLE XXVII

*11a-Chloro-6-Deoxy-6-Demethyl-6-Chloromethylenetetracycline*

*Method A.*—To a mixture of 1.2 g. of the Example XXIV product in 15 ml. of trifluoroacetic acid is added 350 mg. of N-chlorosuccinimide and the mixture is heated at 60° C. After about 3 hours, the mixture gives a negative KI/starch test. The cooled mixture is added dropwise to 500 ml. of cold ether with stirring at ice-bath temperature. After stirring for 3 hours, the precipitated product is filtered, twice slurried in ether and dried to obtain 1 g. of product.

The product is dissolved in 300 ml. of hot methanol, filtered to remove a small amount of insoluble material and concentrated to a volume of 100 ml. Then 3 ml. of p-toluenesulfonic acid dissolved in methanol is added and the mixture permitted to stand at room temperature until crystallization is completed. The product is obtained as the p-toluenesulfonate salt by filtering the precipitate, washing with methanol and dried.

Infrared analysis of the product shows a clear sharp curve with a band of 5.69$\mu$.

Ultraviolet analysis in 0.01 N methanolic HCl shows maxima 245 and 378 m$\mu$.

Elemental analysis gives the following results: Calcd. for: $C_{29}H_{28}O_{10}N_2Cl_2S$ (as the p-toluenesulfonate salt): C, 52.18; H, 4.2; N, 4.2; Cl, 10.6; S, 4.8. Found: C, 51.8; H, 4.3; N, 4.3; Cl, 10.3; S, 4.8.

*Method B.*—1 gram of the product of Example XXIV is placed in a polyethylene container maintained in an ice water bath. To this is added 5 ml. of liquid hydrogen fluoride, followed by 330 mg. of N-chlorosuccinimide. The mixture is allowed to stir at ice bath temperature for one hour, and then poured into 10 ml. of methanol containing 1.2 g. paratoluene sulfonic acid. Ether, 25 ml., is slowly added, and the product crystallizes as the pure toluenesulfonate salt. It is recovered by filtration, washed with ether and dried, to yield 950 mg. Alternatively, the HF reaction mixture is poured into isopropanol containing nitric acid and the product isolated as the nitrate salt.

Following the described procedures, 11a-fluoro-6-deoxy-6-demethyl-6-methylenetetracycline is converted to the corresponding 11a-fluoro-chloromethylene compound.

EXAMPLE XXVIII

*11a-Chloro-6-Deoxy-6-Demethyl-6-Bromomethylenetetracycline*

To a mixture of 4.8 g. of the Example XXIV product in 40 ml. of trifluoroacetic acid is added a solution of 0.54 ml. of bromine in 10 ml. of acetic acid. The mixture is warmed at 40°–60° C. for one hour and then allowed to stand for 12 hours at room temperature. The crude product is obtained by the same work-up as in the previous example. It is crystallized from methanol as the p-toluenesulfate salt (3.54 g.). Ultraviolet analysis in 0.01 N methanolic HCl shows maxima at 249 and 379 m$\mu$.

In the same way, 11a-fluoro-6-deoxy - 6 - demethyl - 6 - methylenetetracycline is converted to the corresponding 11a-fluoro-bromomethylene compound.

EXAMPLE XXIX

*11a-Chloro-9-Bromo-6-Deoxy-6-Demethyl-6-Bromomethylenetetracycline*

To a mixture of 280 mg. of the Example XIV product in ml. of trifluoroacetic acid is added 1.05 ml. of a solution of 0.53 ml. of bromine in 10 ml. of acetic acid. A heavy orange precipitate forms in the mixture, which is then stirred and warmed at 60° C. for 2 hours. The mixture is then allowed to stand for 48 hours and the product (287 mg.) then obtained by work-up with ether as previously described. The product is crystallized as the sulfate salt by dissolving in 5 ml. of methanol and adding 6 drops of conc. $H_2SO_4$.

Ultraviolet analysis of the product in 0.01N methanolic HCl shows maxima at 251 and 384 m$\mu$.

EXAMPLE XXX

*9,11a-Dichloro-6-Deoxy-6-Demethyl-6-Chloromethylenetetracycline*

This product is prepared according to the procedure of Example XXVII by using two molar equivalents of N-chlorosuccinimide.

EXAMPLE XXXI

*11a-Chloro-9-Nitro-6-Demethyl-6-Deoxy-6-Methylenetetracycline*

*Method A.*—A mixture of 1 g. of the Example XXIV product in 20 ml. of 50% aqueous acetic acid containing 1 ml. of conc. $HNO_3$ is allowed to stand for 12 hours, as the product crystallizes as the nitrate salt. The product is collected by filtration, water-washed and dried.

*Method B.*—11a-Chloro-6-demethyl-6-deoxy-6-methylene tetracycline hydrochloride, one gram, is suspended with stirring in 40 ml. 5% aqueous nitric acid at 60° C. After 24 hours, an orange solid is recovered by filtration. The wet cake is taken up in 300 ml. hot methanol, treated with activated carbon, filtered and the filtrate concentrated to 20 ml. 5% Nitric acid, about 1 ml., is added, and the product allowed to crystallize as the nitrate salt on overnight refrigeration. Yield is 130 mg.

The products of these procedures exhibit ultraviolet absorption maxima in methanol: 0.01 N HCl at 257 and 371 m$\mu$; and in methanol: 0.01 N NaOH at 254 and 460 m$\mu$.

The following additional nitro compounds are prepared from the corresponding products having hydrogen at the 9 position by the foregoing method:

7,11a-dichloro-9-nitro-6-demethyl-6-deoxy-6-methylenetetracycline
11a-chloro-9-nitro-6-demethyl-6-deoxy-6-chloromethylenetetracycline
11a-chloro-9-nitro-6-demethyl-6-deoxy-6-bromomethylenetetracycline
11a-chloro-7-bromo-9-nitro-6-deoxy-6-demethyl-6-methylenetetracycline
11a-fluoro-9-nitro-6-deoxy-6-demethyl-6-methylenetetracycline
11a-fluoro-9-nitro-6-deoxy-6-demethyl-6-chloromethylenetetracycline
11a-fluoro-9-nitro-6-deoxy-6-demethyl-6-bromomethylenetetracycline

EXAMPLE XXXII

*11a-Chloro-9-Nitro-6-Deoxy-6-Demethyl-6-Chloromethylenetetracycline*

This product is obtained from that of Example XXXI by the chlorination procedure of Example XXVII, Method A.

EXAMPLE XXXIII

*6-Deoxy-6Demthyl-6-Methylenetetracycline*

*Method A.*—The product of Example XXIV (5 mg.) is dissolved in 3 ml. of methanol and a freshly prepared solution of sodium hydrosulfite (20 mg. in 2 ml. of water) is added. The mixture is allowed to stand for 15 minutes at room temperature, after which it is stripped of methanol and extracted with butanol. The butanol extract is concentrated to obtain the product, 6-deoxy-6-demethyl-6-methylenetetracycline. The product is crystallized from water as the p-toluene-sulfonate salt by addition of p-toluenesulfonic acid. Alternatively, it is crystallized as the hydrochloride salt from water by addition of concentrated HCl.

In a repeated experiment on a larger scale, 500 mg. sodium hydrosulfite is combined with one gram of the substrate in 25 ml. water plus 25 ml. methanol. The reaction mixture is stirred 30 minutes at room temperature and then clarified by filtration. The methanol is evaporated from the filtrate and the residue is extracted with butanol. Evaporation of the extract yields the desired product.

On testing against *K. pneumoniae,* the product has an oxytetracycline activity of at least 1100 mcg./mg. The product shows an Rf value of 0.6 in the same system as described in Example XXIV, and shows Rf 0.9 in the following system.

Mobile Phase:
    20:10:3 nitromethane: chloroform: pyridine
Immobile Phase:
    pH 3.5 buffer (aqueous)

The C.4 epimer of this substance shows Rf's of approximately 0.4 and approximately 0.6 in the two systems.

*Method B.*—A solution of 50 g. of 11a-chloro-6-deoxy-6-demethyl-6-methylenetetracycline hydrochloride in 500 ml. of monomethyl ether of ethylene glycol is cooled to 4° C. in an ice-bath and the rapidly stirred solution is treated with 50 g. of zinc metal dust at a gradual rate over a period of about 10 minutes. The temperature rises to 12° C. during addition. After addition is complete, the tempearture begins to fall. After a total reaction time of 15 minutes the zinc is removed by rapid filtration and washed with solvent. One liter of water is added gradually to the filtrate over a period of about 10 minutes. A yellow slurry of the zinc complex of the product it formed. The pH of the solution is then adjusted to 6.8 with 10% aqueous sodium hydroxide.

The resulting slurry is digested for about 1.5 hours in an ice-bath and filtered. The wet cake is then slurried in 750 ml. of water and conc. HCl is added dropwise until a clear solution is obtained. A slight excess of conc. HCl causes rapid crystallization of 6-deoxy-6-demethyl-6-methylenetetracycline hydrochloride as glistening needles. After digestion for one hour, the product is filtered and dried. The yield of product is 37.8 g. The product melts at 213.8–214.2° C. with decomposition.

*Method C.*—11a-fluoro-6-deoxy-6-demethyl-6-methylenetetracycline, 5 g. in 125 ml. dilute hydrochloric acid (1 part conc. HCl in 55 parts water), is combined with 2 g. zinc dust and stirred one hour at 20° C. The reaction mixture is then filtered and the filtrate extracted with butanol. Evaporation of the butanol extract yields the desired product containing some anhydro compound as impurity.

*Method D.*—To one gram of the same starting compound as in Method C in 25 ml. water plus 25 ml. methanol is added 400 mg. sodium hydrosulfite. Stirring is continued for 20 minutes at room temperature. An additional 400 mg. sodium hydrosulfite is then added and stirring continued 20 minutes longer. This step is repeated a second time and the reaction mixture is finally clarified by filtration and stripped of methanol. Butanol extraction of the residue and evaporation of the extract yields the product.

EXAMPLE XXXIV

The procedure of Example XXXIII, Method A, is repeated to dechlorinate the 11a-chloro-6-methylenetetracyclines of the previous examples to provide the following products:

7-bromo-6-deoxy-6-demethyl-6-methylenetetracycline
7-chloro-6-deoxy-6-demethyl-6-methylenetetracycline C.4 epimers occur as impurities.

EXAMPLE XXXV

*6-Deoxy-6-Demethyl-6-Chloromethylenetetracycline*

*Method A.*—To 1 mmole of the Example XXVII product in 25 ml. methanol is added 100 mg. of 5% rhodium on carbon. The mixture is hydrogenated with shaking at room temperature and one atmosphere of hydrogen gas until 1 mmole of hydrogen is taken up. After filtering off the catalyst, the solution is evaporated to dryness under reduced pressure. The residue is slurried in ether, filtered and dried to obtain the product.

*Method B.*—The product of Example XXVII, 6.7 g. as the p-toluene sulfonate salt, is stirred in 400 ml. of 50% methanol-water at room temperature. 1.34 g. of sodium hydrosulfite is added to the slurry, and stirring is continued for 45 minutes. A second 1.34 g. portion of sodium hydrosulfite is then added, and stirring continued for another 45 minutes. Insoluble material (0.57 g.) is removed by filtration.

The filtrate is stripped under vacuum to remove the methanol, leaving a yellow-orange slurry. The slurry is extracted with several portions of butanol, and the butanol extracts are combined and evaporated to dryness under vacuum to yield the crude product. Ether is added, and the mixture is stirred and then filtered to obtain 3.4 g. of final product.

Using these procedures, the following compounds are prepared from the corresponding 11a-halo compounds:

6-deoxy-6-demethyl-6-bromoethylenetetracycline
9-bromo-6-deoxy-6-demethyl-6-bromomethylene-
tetracycline
9-chloro-6-deoxy-6-demethyl-6-chloromethylene-
tetracycline
6-deoxy-6-demethyl-6-iodomethylenetetracycline
7-chloro-6-methylenetetracycline
7-bromo-6-methylenetetracycline
9-bromo-6-demethyl-6-deoxy-6-chloromethylene-
tetracycline

EXAMPLE XXXVI

*9-Nitro-6-Demethyl-6-Deoxy-6-Methylenetetracycline*

11a - chloro - 9 - nitro - 6 - demethyl - 6 - deoxy - 6-methylenetetracycline, 5 g. as the nitrate salt (prepared as in Example XXXI), is stirred with 10 g. sodium iodide in 200 ml. acetone for about 5 minutes, and then filtered to clarify. The product precipitates from the filtrate upon standing overnight and is recovered by filtration and dried. 4.0 g. of product are obtained, containing some of the corresponding 5a,6-anhydro compound as a minor impurity. An ultraviolet absorption maximum is observed at about 368 mμ.

Application of the foregoing procedure to the other 11a-chloro products of Example XXXI produces the following compounds:

7-chloro-9-nitro-6-demethyl-6-deoxy-6-methylene-
tetracycline
9-nitro-6-demethyl-6-deoxy-6-chloromethylene-
tetracycline
9-nitro-6-demethyl-6-deoxy-6-bromoethylenetetracycline
7-bromo-9-nitro-6-deoxy-6-demethyl-6-methylene-
tetracycline

EXAMPLE XXXVII

*9-Amino-6-Dexoy-6-Demethyl-6-Methylenetetracycline*

*Method A.*—To 1 mmole of the Example XXXI product in 25 ml. of methanol is added 100 mg. of 5% rhodium on carbon. The mixture is hydrogenated with shaking at room temperature and one atmosphere of hydrogen gas until 4 equivalents of hydrogen are taken up. After filtering off the catalyst, the solution is evaporated to dryness under reduced pressure. The residue is slurried in ether, filtered and dried to obtain the product.

The same product is obtained from 9-nitro-6-methylenetetracycline at correspondingly lower hydrogen uptake.

Using this procedure, the following compounds are prepared from the corresponding 11a-chloro compounds of Example XXXI.

7-chloro-9-amino-6-demethyl-6-deoxy-6-methylene-
tetracycline
9-amino-6-demethyl-6-deoxy-6-chloromethylene-
tetracycline
9-amino-6-demethyl-6-deoxy-6-bromomethylene-
tetracycline
7-bromo-9-amino-6-deoxy-6-demethyl-6-methylene-
tetracycline

*Method B.*—The title product is also obtained from 9-nitro-6-methylenetetracycline and the corresponding 11a-chloro and 11a-fluoro derivatives by the hydrosulfite procedure of Example XXXIII, Method D.

*Method C.*—The title product is also obtained from 11a-fluoro-9-nitro-6-methylenetetracycline by the zinc reduction of Example XXXIII, Method C.

EXAMPLE XXXVII-A

*9-Amino-6-Deoxy-6-Demethyl-6-Chloromethyl-enetetracycline*

*Method A.*—11a - fluoro - 9-nitro - 6 - chloromethylenetetracycline, 1 g., is combined with 15 ml. 5% hydrochloric acid and 4.2 equivalents stannous chloride. After stirring for one hour at room temperature, the reaction mixture is butanol-extracted and the product recovered by evaporation of the extract. The same product is obtained from the corresponding 11a-chloro starting compound by this procedure.

*Method B.*—The same starting compound yields the title product by the hydrosulfite procedure of Example XXXIII, Method D.

*Method C.*—The same starting compound yields the title product by the zinc reduction of Example XXXIII, Method C, with the substitution of 1:7 conc. HCl:water for the 1:55 acid of that earlier example.

9 - amino - 6 - deoxy - 6 - demethyl - 6 - bromomethylenetetracycline is also obtained by these procedures from the corresponding starting compound.

EXAMPLE XXXVIII

*6-Demethyl-6-Chloromethyl-5a,6-Anhydrotetracycline*

*Method A.*—Three grams of the Example XXXV product is dissolved in 15 ml. of dry, liquid hydrogen fluoride and the mixture heated for 48 hours at 75° C. in a stain-steel bomb. The mixture is then evaporated to dryness under nitrogen and the residue triturated with ether, filtered, washed with ether and dried.

*Method B.*—1 g. of the same starting compound as in Method A is heated at reflux temperature for 24 hours in a mixture of 10 ml. acetone and 10 ml. dimethylformamide. The reaction mixture is then taken to dryness on a rotating evaporator under high vacuum to obtain the product.

*Method C.*—A mixture of 1.5 g. of the same starting compound in 25 ml. 5% hydrochloric acid is combined with 3 ml. of a solution of 12 g. iodine and 8.5 g. potassium iodide in 25 ml. water. The reaction mixture is stirred overnight at room temperature, and an equivalent proportion of sodium thiosulfate is then added to destroy the iodine. The product is recovered by butanol extraction followed by evaporation of the combined extracts under vacuum.

*Method D.*—1 g. of the same starting compound in 20 ml. 20% hydrochloric acid is subjected to one atmosphere hydrogen pressure for 2 hours at room temperature in the presence of 200 mg. 5% palladium on carbon. The reaction mixture is then filtered and the filtrate diluted with water. The product is recovered from the diluted filtrate by butanol extraction, followed by evaporation of the combined extracts under vacuum.

Using these procedures, the following compounds are prepared from corresponding starting compounds:

6-demethyl-6-bromomethyl-5a,6-anhydrotetracycline
9-bromo-6-demethyl-6-bromomethyl-5a,6-anhydrotetracycline
9-chloro-6-demethyl-6-chloromethyl-5a,6-anhydrotetracycline
9-nitro-5a,6-anhydrotetracycline
9-nitro-6-demethyl-6-chloromethyl-5a,6-anhydrotetracycline
9-nitro-6-demethyl-6-bromomethyl-5a,6-anhydrotetracycline
9-amino-5a,6-anhydrotetracycline
9-amino-6-demethyl-6-chloromethyl-5a,6-anhydrotetracycline
9-amino-6-demethyl-6-bromoethyl-5a,6-anhydrotetracycline The above enumerated amino compounds are also prepared from the corresponding nitro anhydro compounds by reduction, e.g. by catalytic reduction over rhodium by the method previously described.

9-nitro-5a,6-anhydrotetracycline is also prepared from 9-nitro-6-demethyl-6-deoxy-6-methylenetetracycline in the following manner: 500 mg. of the product of Example XXXVI is dissolved in 20 ml. methanol by warming, and 600 mg. 2-naphthalene sulfonic acid is added. The reaction mixture is permitted to stand at room temperature for 60 hours and then is clarified by filtration. 10 ml. isopropanol is next added, and the mixture is heated to boiling for 5 minutes. 200 mg. of the desired product in the form of the naphthalene sulfonate salt crystallizes from the reaction mixture upon cooling to room temperature, and an additional 190 mg. is obtained from the mother liquor in two succeeding crops.

EXAMPLE XXXIX

*6-Demethyl-6-Chloromethyl-5,5a-Dehydrotetracycline*

*Method A.*—A sterile water suspension containing 60–80 million spores per ml. of *S. aureofaciens* ATCC 12,748 is employed to inoculate 24 volumes of a sterile tap water medium containing the following ingredients per liter.

| | |
|---|---|
| Sucrose _____ g__ | 30 |
| Ammonium sulfate _____ g__ | 2 |
| Calcium carbonate _____ g__ | 7 |
| Cornsteep liquor _____ ml__ | 16.5 |

The inoculated medium is incubated for 24 hours at 28° C. with shaking.

This inoculum is introduced into 25 times its volume of sterile water medium containing the following ingredients per liter.

| | Grams |
|---|---|
| Ammonium sulfate _____ | 5 |
| Calcium carbonate _____ | 9 |
| Ammonium chloride _____ | 1.5 |
| Magnesium chloride hexahydrate _____ | 2 |
| Ferrous sulfate heptahydrate _____ | 12 |
| Manganese sulfate tetrahydrate _____ | 10 |
| Cobalt chloride hexahydrate _____ | 1 |
| Zinc sulfate heptahydrate _____ | 20 |
| Cornsteep liquor _____ | 25 |
| Starch _____ | 55 |

The inoculated medium is incubated at 25° C. on a rotary shaker for 48 hours. At this point, 6-deoxy-6-demethyl-6-chloromethyl-5a,6-anhydrotetracycline is added to the broth under sterile conditions at a concentration of 0.5 g./l. and the fermentation is allowed to proceed for an additional 72 hours under serating conditions.

The fermentation is then halted and the product recovered by adjusting the pH of the broth to 1.5 with conc. HCl and filtering. The filter cake is washed with dilute acid, the combined filtrate and washings are treated with sodium chloride (54 g. per 200 ml. of filtrate) and extracted with n-butanol. The combined butanol extracts are concentrated to about one-tenth of the original volume, saturated with water and filtered. The filtrate is passed onto a column of diatomaceous earth (Johns Manville Celite) containing 0.5 ml. of water (adjusted to pH 2 with HCl) per gram of Celite. The column is then developed with butanol-chloroform saturated with 0.01 N HCl to obtain the product in the major fractions which are concentrated to obtain the product.

*Method B.*—A 0.1% w./v. solution in toluene of the anhydrotetracycline starting compound of Method A is exposed to light of 300–450 m$\mu$ wave length at room temperature while oxygen is introduced beneath the surface at a rate of 0.25 volume per unit volume solution per minute. When paper chromatography of a sample demonstrates substantial disappearance of the starting compound the reaction mixture is evaporated, and 6-deoxy-6-demethyl - 6 - hydroperoxy-6-chloromethyl dehydrotetracycline is recovered in good yield.

A 1% w./v. solution of this intermediate in chloroform is shaken with 2 volumes of 10% w./v. sodium hydrosulfite, and the chloroform phase is evaporated to recover the desired dehydrotetracycline product.

Using the procedures of this example, the following compounds are prepared from the corresponding products of Example XXXVIII:

6-demethyl-6-bromomethyl-5,5a-dehydrotetracycline
9-bromo-6-demethyl-6-bromoethyl-5,5a-dehydrotetracycline
9-chloro-6-demethyl-6-chloromethyl-5,5a-dehydrotetracycline
9-amino-5,5a-dehydrotetracycline
9-amino-6-demethyl-6-chloromethyl-5,5a-dehydrotetracycline
9-amino-6-demethyl-6-bromomethyl-5,5a-dehydrotetracycline

What is claimed is:

1. An anhydrotetracycline selected from the group consisting of

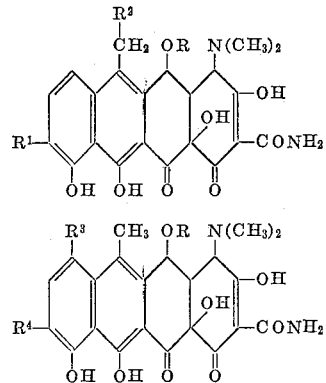

and wherein R is selected from the group consisting of lower alkyl and benzyl; $R^1$ is selected from the group consisting of hydrogen, chloro, bromo, iodo and amino; $R^2$ is selected from the group consisting of chloro, bromo and iodo; $R^3$ is selected from the group consisting of hydrogen and chloro; $R^4$ is selected from the group consisting of hydrogen and amino; the acid addition salts thereof, and the pharmaceutically acceptable metal salts thereof.

2. 5-lower alkoxy-5a,6-anhydro-7-chlortetracycline.
3. 5-lower alkoxy-5a,6-anhydrotetracycline.
4. 5-methoxy-5a,6-anhydro-7-chlortetracycline.
5. 5-ethoxy-5a,6-anhydrotetracycline.
6. 5-benzyloxy-5a,6-anhydro-7-chlortetracycline.
7. 5 - methoxy-5a,6-anhydro-7-chloro-9-aminotetracycline.

8. A dehydrotetracycline selected from the group consisting of

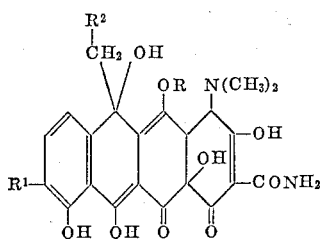

and

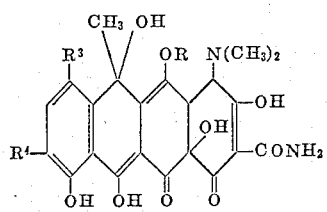

wherein R is selected from the group consisting of lower alkyl and benzyl; $R^1$ is selected from the group consisting of hydrogen, chloro, bromo, iodo and amino; $R^2$ is selected from the group consisting of chloro, bromo and iodo; $R^3$ is selected from the group consisting of hydrogen and chloro; and $R^4$ is selected from the group consisting of hydrogen and amino; and the alkali and alkaline earth metal salts thereof.

9. 5-lower alkoxy-5,5a-dehydro-7-chlortetracycline.
10. 5-lower alkoxy-5,5a-dehydrotetracycline.
11. 5-methoxy-5,5a-dehydro-7-chlortetracycline.
12. 5-ethoxy-5,5a-dehydrotetracycline.
13. 5-benzyloxy-5,5a-dehydro-7-chlortetracycline.
14. 5-methoxy-5,5a-dehydro-7-chloro-9 - aminotetracycline.

15. A tetracycline selected from the group consisting of

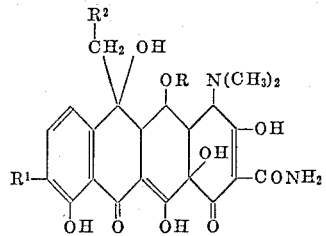

and

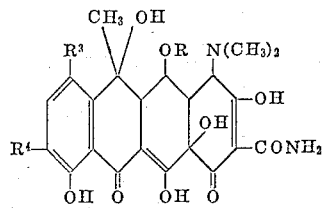

wherein R is selected from the group consisting of lower alkyl and benzyl; $R^1$ is selected from the group consisting of hydrogen, chloro, bromo, iodo and amino; $R^2$ is selected from the group consisting of chloro, bromo and iodo; $R^3$ is selected from the group consisting of hydrogen and chloro; and $R^4$ is selected from the group consisting of hydrogen and amino; the acid addition salts thereof, and the pharmaceutically acceptable metal salts thereof.

16. 5-lower alkoxy-7-chlortetracycline.
17. 5-lower alkoxy-tetracycline.
18. 5-methoxy-7-chlortetracycline.
19. 5-ethoxytetracycline.
20. 5-benzyloxy-7-chlortetracycline.
21. 5-methoxy-7-chloro-9-aminotetracycline.

No references cited.